(No Model.)
I. KITSEE.
CHARGING SECONDARY BATTERIES.
No. 578,823. Patented Mar. 16, 1897.
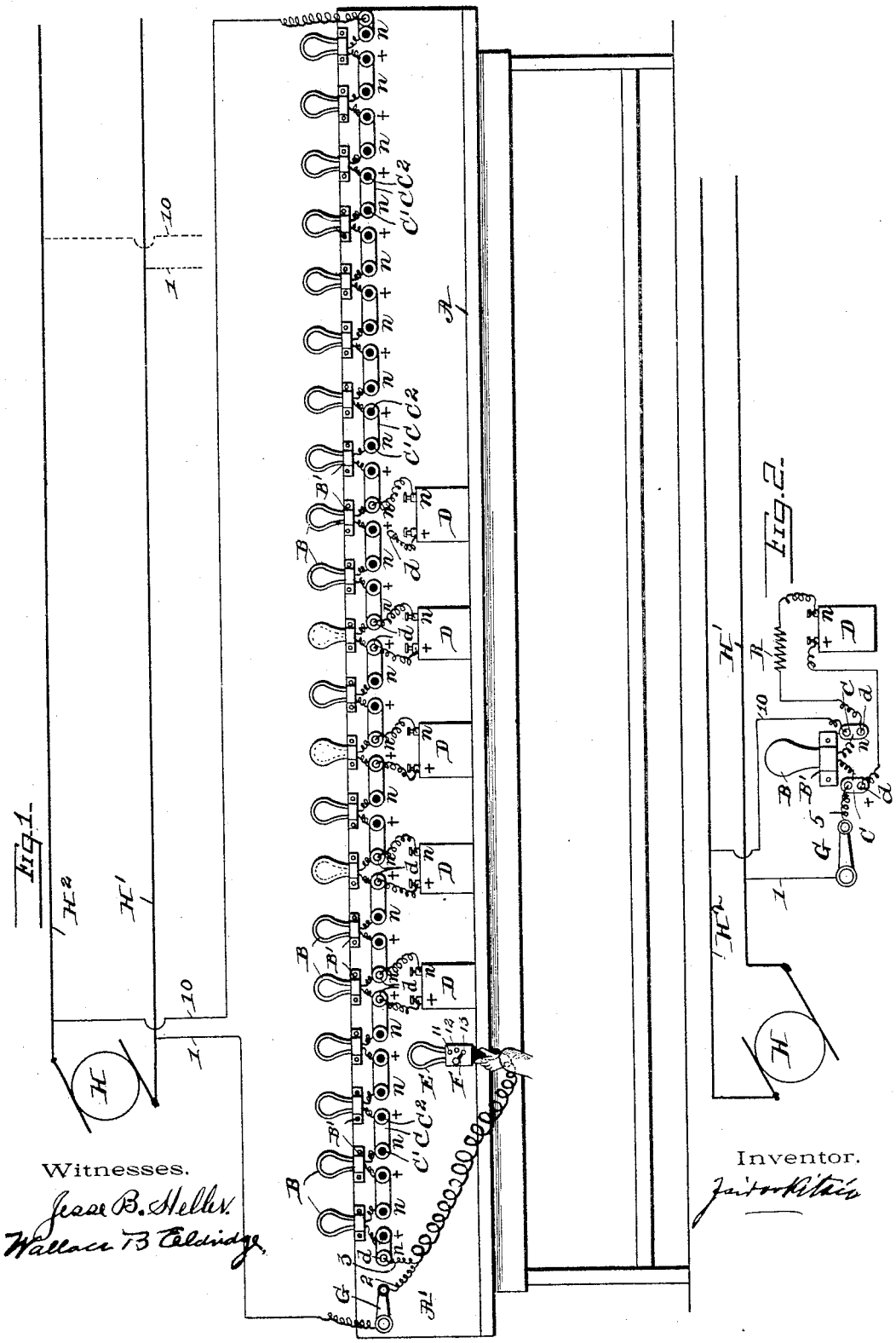
Witnesses.
Jesse B. Heller
Wallace B. Eldridge
Inventor.
Isidor Kitsee

UNITED STATES PATENT OFFICE.

ISIDOR KITSEE, OF PHILADELPHIA, PENNSYLVANIA.

CHARGING SECONDARY BATTERIES.

SPECIFICATION forming part of Letters Patent No. 578,823, dated March 16, 1897.

Application filed November 2, 1895. Serial No. 567,715. (No model.)

*To all whom it may concern:*

Be it known that I, ISIDOR KITSEE, of the city and county of Philadelphia, State of Pennsylvania, have invented certain new and useful Improvements in the Arrangement for Charging Secondary Batteries, of which the following is a specification.

My invention relates to the charging of secondary batteries, and has more especially reference to the charging of battery sets where each set is composed only of a very small number of single cells, as, for instance, battery sets used for telephonic purposes.

Telephone companies supply the outlying subscribers' stations with the necessary electric energy in the form of primary cells. The most commonly used cell is the Fuller-Lee cell—a bichromate double fluid type—which cell is in the most cases used in sets of two, furnishing the current without necessitating renewal for about two months. After this time the depolarizing fluid as well as the fluid in the porous cup has to be renewed. Now it is well known that a containing jar such as used in the Fullers, being about eight inches high by six inches in diameter, can be made to contain depolarizing material with capacity five and more times as great as the current required for a two months' service on a telephone, and it is well understood by the persons familiar with the working of such cell that the destructive action of the depolarizing fluid and the neutralization of the fluid in the porous cup through the first-named fluid takes place even at the time when the cell is idle, which, taking the active service of a busy telephone as two hours per day, is twelve times the period of the employment of the cell. The employment, therefore, of secondary cells for outlying subscribers' stations would in the majority of cases be preferred were it not for the fact that the charging of large numbers of small batteries with the arrangement as is now in use requires skilled labor and a great outlay in plants. In fact, secondary batteries are to-day not employed in outlying telephone-stations on account of the additional trouble associated with them when once discharged. To obviate the difficulties experienced to-day in the charging of such battery sets is the object of my invention.

As said above, two Fullers are usually employed in outlying subscribers' stations, but it was found that the service is improved if the electromotive force could be raised to three and one-half volts on closed circuit and maintained at that figure. Two cells of secondaries would therefore give all the required service.

The current necessary, roughly calculated, for a three months' service would be, average current one-eighth of an ampere two hours per day equals one-fourth of an ampere-hour less that twenty-five ampere-hours. A secondary cell weighing about five pounds would furnish the necessary twenty-five ampere-hours at the rate above mentioned. The double cell therefore will weigh about ten pounds, a weight lower than the weight of two Fuller cells.

The great disadvantage arises when the cells, after having performed the three months' service, are gathered up and returned for charging.

First of all, it would be advantageous not to supply the outlying stations with the batteries all at one time, but to do it successively, a certain number at each period, so that the exhaustion of the cells would also be successive. In a system, for instance, of, say, five thousand subscribers the batteries should be supplied to about four hundred subscribers each week. Each week after the three succeeding months four hundred batteries will have to be charged if such arrangement is carried out.

I intend to make use of the electric-light current with which now nearly every prominent building in larger towns is supplied. The first requisite is to enable the men in charge of the batteries to discover at a glance if the battery to be charged is in good enough condition for further use or is internally short-circuited, &c. It is also important for them to know when the battery is fully charged. It also is important that the mode of connecting and disconnecting should be a simple one and that possible errors should be as much as possible guarded against.

To this end my invention consists of the arrangement as illustrated in the drawings, described in the specification, and pointed out in the claims following the specification.

Referring to the drawings, Figure 1 is a diagram of a charging-station. Fig. 2 is a similar view of a station charging one set of battery in multiple arc and variable resistance inserted in series with the battery to be charged.

H is the dynamo.

H' and H² are the main wires carrying the current.

As stated above, it is my intention to use the electric current from the incandescent-lamp circuits, and such current being usually of one hundred and ten volts I have illustrated my invention as applied to a circuit carrying a current of such potentiality.

A is the table or support for the batteries to be charged.

A' is the support for the lamps.

B B' are the lamp-sockets. C are the plates for such sockets, connecting one terminal of one lamp to one terminal of the next following lamp.

C' are the perforated conducting-plates secured to the negative pole of the lamp, and C² are the perforated conducting-plates secured to the positive pole of the lamp.

D are the batteries, provided with the conducting-plugs $d$, designed to be inserted in the perforations of C' and C², respectively.

G is a hand-switch for opening or closing the lamp-circuit in its entirety.

E is what I term the "guide-lamp," the function of which will later on be described.

F is the resistance placed in multiple arc to the filament of said lamp.

11, 12, and 13 are the contact-points through which more or less resistance can be thrown into or out of the circuit by the aid of a small hand-switch.

The wire 1 connects wire H' with one terminal of the charging-circuit, and the wire 10 connects the wire H² with the other terminal of the charging-circuit. The wires 2 and 3 are the feed-wires for the guide or test lamp E.

In Fig. 2, R is the variable resistance placed in the circuit with the charging-battery. The perforated socket-plates are also provided with the pole designation "+" for positive and "n" for negative pole, corresponding with the pole designation on the battery sets.

I have illustrated in the drawings the charging-circuit to contain twenty-two lamps, and it is therefore obvious that with a current of the potential as usually employed in incandescent circuits, and allowing only a current of about six-tenths of an ampere to flow through each of the twenty-two lamps, each of said lamps when incandescent will need a current-potential of about five volts, which potential will also be needed in the process of charging by one battery set after fully charged.

The *modus operandi* is the following: The main circuit as well as the circuit of each of the twenty-two lamps is closed, the resistance-circuit of guide-lamp left open. The filaments of all these lamps will therefore be in nearly equal incandescence. A battery set consisting of two single cells is now brought to be charged. The extreme terminals of this battery are marked "+" and "n," respectively, and are each provided with a wire ending in the plug $d$. All, therefore, the attendant has to do is to insert the plug from + into the perforation of the + plate of one lamp and the plug from "n" into the perforation of the "n" plate of the same lamp. To satisfy himself that the battery is not short-circuited, the attendant closes the resistance-circuit of guide-lamp E on the point 13, which inserts a resistance about equal to the offered resistance of the battery set when discharged. The glow of the two lamps, the guide-lamp and the charging-lamp, must then be nearly equal. If such is the case, the charging may continue, but should the filament be as bright as before the insertion of the battery then it is evident that the contacts in the battery or its plates are in a condition needing repair, and if the filament of the charging-lamp should be a great deal darker than the filament of the guide-lamp it is evidence that the battery is internally short-circuited. In both cases the battery in question has to be sent to the repair-room or returned to the concern furnishing said batteries for repair. After satisfying himself that the battery is in good condition the lamp-key (not illustrated in the drawings, as the usual key with which each commercial lamp is provided can be used) may be opened so that the battery replaces the lamp entirely. At intervals during the charging time a comparison of the incandescence of the filaments of the guide-lamp, the resistance-circuit closed at 12, inserting a resistance about equal to a partial charged battery set, with the charging-lamp key closed, may be made. The current flowing through the lamp-circuits, and therefore through the battery-circuits replacing the lamp-circuit, may vary somewhat, but it is safe to say that the average flow will be nearly equal, and as the same is about six-tenths of an ampere the charging time for a battery of twenty-five ampere-hours' capacity will be about forty-eight to fifty hours. At the end of this time the attendant should again compare the incandescence of his guide-lamp, resistance-circuit closed at 11, inserting a resistance about equal to a fully charged and charging battery set, with the incandescence of the charging-lamp, and if the incandescence of both is equal, or nearly so, the battery set is in good order and fully charged. It is, under this arrangement, not absolutely necessary that all the batteries should be inserted in the charging-circuit at one and the same time, but it is best to mark the date of the beginning of the charge, say with chalk, on the jar of the battery.

Having now described my invention, what I claim as new, and desire to secure by Letters Patent, is—

1. In combination, a charging plant for secondary cells consisting of a circuit carrying a current of comparative high electromotive force, a series of incandescent lamps of comparative small resistance placed in multiple arc as to the main circuit but in series as to each other, and sets of secondary batteries, placed each in multiple arc to one of said small-resistance lamps.

2. A charging plant for secondary batteries consisting of a number of incandescent lamps of comparatively small resistance, placed in series as to each other and connected to one common incandescent circuit of comparatively high potential, each lamp being provided with an individual subcircuit designed to be closed around one battery set, said lamp-circuit also containing an additional lamp provided with a resistance-circuit adapted to be opened and closed, shunting said additional lamp.

3. A charging-plant for secondary cells consisting of a circuit carrying a current of comparatively high electromotive force, a series of incandescent lamps of comparatively small resistance placed in multiple arc as to the main circuit but in series as to each other, sets of secondary batteries the terminals of each set of which are connected each to the terminals of one small-resistance lamp and means for throwing said lamps in and out of the circuit.

4. In a charging plant for secondary batteries, a number of incandescent lamps connected in series as to each other, each pole of each lamp being connected to a conducting-plate adapted to receive the terminal of one pole of a battery set, substantially as and for the purpose specified.

5. A charging-circuit for secondary cells consisting of a number of incandescent lamps connected in series as to each other, the terminals of each lamp being provided with means for the insertion of a battery set in shunt or multiple arc, said charging plant being also provided with a guide-lamp adapted to give with the aid of resistance, different glow intensities, substantially as and for the purpose specified.

In testimony whereof I sign my name, this 25th day of October, 1895, in the presence of two subscribing witnesses.

ISIDOR KITSEE.

Witnesses:
WALLACE B. ELDRIDGE,
JESSE B. HELLER.